United States Patent [19]

Aoki et al.

[11] Patent Number: 4,561,767

[45] Date of Patent: Dec. 31, 1985

[54] BOTH-SIDE RECORDING APPARATUS

[75] Inventors: Tomohiro Aoki, Yokohama; Hidetoshi Tanaka, Musashino, both of Japan

[73] Assignee: Canon Kabushiki Kaisha, Tokyo, Japan

[21] Appl. No.: 703,497

[22] Filed: Feb. 20, 1985

Related U.S. Application Data

[60] Division of Ser. No. 611,430, May 17, 1984, abandoned, which is a continuation of Ser. No. 371,018, Apr. 22, 1982, abandoned.

[30] Foreign Application Priority Data

Apr. 28, 1981 [JP] Japan .................................. 56-64502

[51] Int. Cl.⁴ ........................ G03B 27/32; G03B 27/52

[52] U.S. Cl. ...................................... 355/26; 355/3 SH

[58] Field of Search .................... 355/24, 26, 3 SH, 72

[56] References Cited

U.S. PATENT DOCUMENTS

| | | | |
|---|---|---|---|
| 4,130,354 | 12/1978 | Steiner | 355/26 |
| 4,229,100 | 10/1980 | Travis | 355/26 |
| 4,317,629 | 3/1982 | Kuseki | 355/24 |
| 4,385,825 | 5/1983 | Kaneko | 355/26 |

FOREIGN PATENT DOCUMENTS

| | | | |
|---|---|---|---|
| 3049340 | 10/1981 | Fed. Rep. of Germany | 355/26 |

*Primary Examiner*—Monroe H. Hayes
*Attorney, Agent, or Firm*—Fitzpatrick, Cella, Harper & Scinto

[57] ABSTRACT

A both-side recording apparatus in which sheets having a first image recorded on a first side thereof are temporally contained in a relay tray and subsequently a second image is recorded on a second side of the sheets has a first side recording compensation mode in which if a deficiency occurs in the number of sheets during the sheet first side recording operation, recording is continuedly effect on sheets corresponding to the number of deficient sheets, a second side recording compensation mode in which if a deficiency occurs in the number of sheets during the sheet second side recording operation, the second image is continuedly recorded on the first side of sheets corresponding to the number of deficient sheets after the recording of the second image on the second side of the sheets from the relay tray has been terminated, whereafter the first image is recorded on the second side of said sheets, and a device for changing over a transportation path so that where the image recorded on the second side of the compensationally recorded sheets is the second image, the compensationally recorded sheets are reversed zero time or even times or odd times in accordance with whether the number of times of the reversing process of the sheets before compensationally recorded is zero or even or odd and that where the image recorded on the second side of the compensationally recorded sheets is the first image, the compensationally recorded sheets are reversed odd times or zero time or even times in accordance with whether the number of times of the reversing process of the sheets before compensationally recorded is zero or even or odd.

2 Claims, 6 Drawing Figures

BOTH-SIDE RECORDING APPARATUS

This is a continuation of application Ser. No. 611,430, filed May 17, 1984, now abandoned, which in turn is a continuation of Ser. No. 371,018, filed Apr. 22, 1982, now abandoned.

BACKGROUND OF THE INVENTION

1. Field of the Invention

This invention relates to a both-side recording apparatus for recording images on both sides of recording sheets.

2. Description of the Prior Art

Various both-side recording apparatuses for recording images on both sides of recording sheets (including what is called copy paper) have heretofore been devised and among them, there is one in which usual one-side recording is effected on one side of the sheets and the one-sided recorded sheets are again directed to the paper supply station or to a separate second paper supply station and then fed back to the recording process station, where recording of an image is effected on the back side of the sheets in the same manner as the front side thereof. This can be said to be the most practical both-side recording apparatus because it only requires one set of recording process stations and it is simple and compact in construction.

However, even in such type of both-side recording apparatus, if provided with a sheet containing tray, a sheet sorting device (sorter), etc., the conditions of the front and back sides of the discharged sheets may differ from each other in the case of the front side recording or the back side recording or the front and back sides of the sheets may differ from each other due to the selection of the transportation path of the sheets and thus, complicated selection of reversal is required. Particularly, when a jam of sheets has occurred in the course of the front side or back side recording operation, there arises the necessity of again effecting the same recording operation to compensate for the recording on the remaining number of sheets and further, depending on the time when the jam occurs, the selection of the reversal may differ and thus, the operation of the apparatus becomes very complicated and the efficiency of the recording operation decreases.

SUMMARY OF THE INVENTION

In view of the above-noted problems, it is an object of the present invention to provide an improved and novel both-side recording apparatus.

It is another object of the present invention to provide a both-side recording apparatus which can compensate for the recording on the remaining number of sheets when a jam has occurred in the course of recording operation, particularly, in the course of a recording operation being effected on a second side of the sheets.

It is still another object of the present invention to provide a both-side recording apparatus which can efficiently continue the recording process even when a jam has occurred during the recording process.

That is, the construction of the present invention comprises a both-side recording apparatus in which sheets having a first image recorded on a first side thereof are temporarily stored in a relay tray and subsequently a second image is recorded on a second side of the sheets. It also has a first side recording compensation mode in which if a deficiency occurs in the number of sheets during the first side sheet recording operation, recording is continuously effected on sheets corresponding to the number of deficient sheets, a second side recording compensation mode in which if a deficiency occurs in the number of sheets during the second side sheet recording operation, the second image is continuously recorded on the first side of sheets corresponding to the number of deficient sheets after the recording of the second image on the second side of the sheets from the relay tray has been terminated. Thereafter, whereafter the first image is recorded on the second side of said sheets. The apparatus also comprises means for changing over a transportation path so that when the image recorded on the second side of the compensationally recorded sheets is the second image, the compensationally recorded sheets are reversed zero times or even or odd increments depending on whether the number of times of the reversing process of the sheets before being compensationally recorded is zero or an even or odd number and when the image recorded on the second side of the compensationally recorded sheets is the first image, the compensationally recorded sheets are reversed an odd number number of times or zero times or an even number of times depending on whether the number of times of the reversing process of the sheets before being compensationally recorded is zero or an even or odd number.

Thus, the present invention, in case of the both-side recording of recording sheets, can efficiently and reliably compensate for the recording sheets both when a jam has occurred during the first side recording and when a jam has occurred during the second side recording of the recording sheets having recorded on the first side thereof, and provides a both-side recording apparatus in which, for example, in the case of both-side copying, the procedure required of the operator to place a first side original (for example $O_1$) for copying for compensation of the number of copy sheets and then place a second side original (for example $O_2$) can be reduced to half and which is very convenient and easy to operate.

The invention will become more fully apparent from the following detailed description thereof taken in conjunction with the accompanying drawings.

DESCRIPTION OF THE PREFERRED EMBODIMENTS

The present invention will hereinafter be described in detail by reference to the drawings showing a both-side copying apparatus which effects copying of originals on both sides of copy paper by the electrophotographic process. However, the present invention is not restricted to such a both-side copying apparatus, but is also applicable to both-side recording apparatus which effect recording on recording sheets by other recording means.

Figure 1:
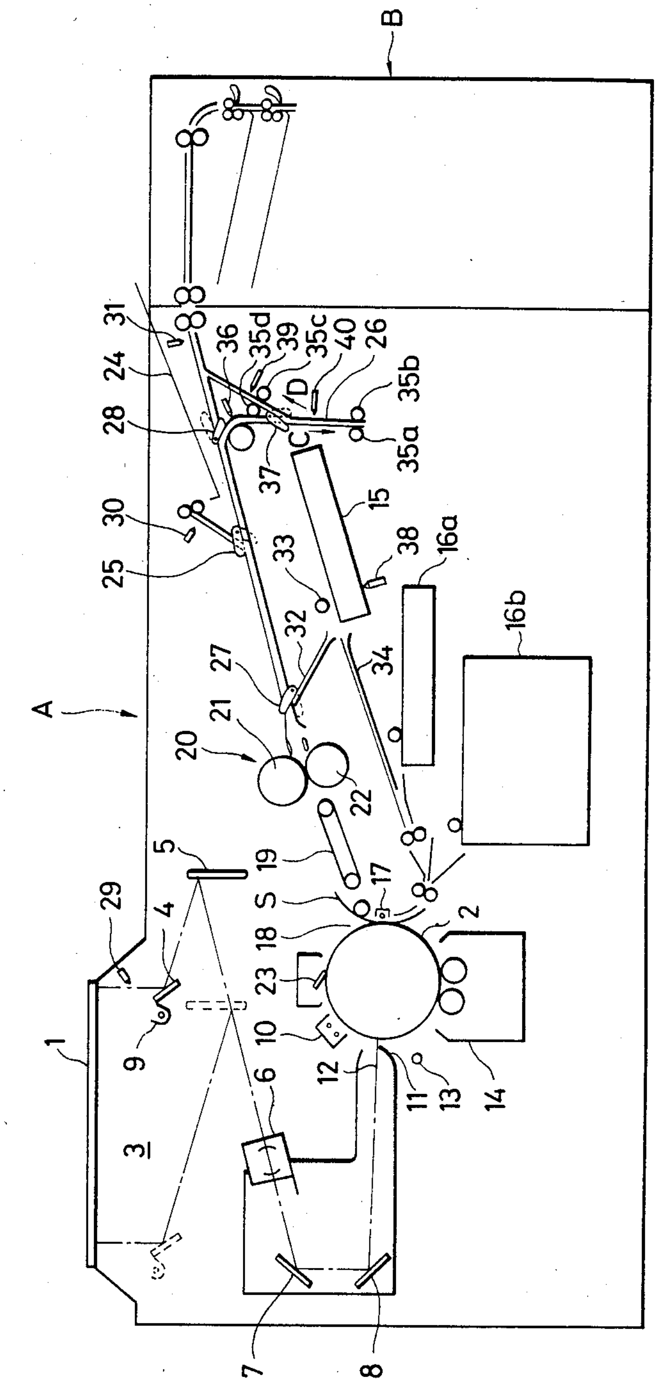
FIG. 1 is a longitudinal cross-sectional view of an embodiment of the present invention.

Referring to FIG. 1 which shows a both-side copying apparatus provided with a sorter which is an embodiment of a both-side recording apparatus, reference A designates the copying apparatus and B denotes the sorter. The copying apparatus A is provided with an original carriage 1, a photosensitive drum 2 and an optical system 3 for forming on the photosensitive drum 2 an image of an original on the original carriage. The optical system 3 comprises movable reflecting mirrors 4 and 5, a lens 6 and stationary reflecting mirrors 7 and 8. The original is slit-exposed and imaged on the drum 2 with the length of the optical path being maintained equal by the movable reflecting mirror 4 moved with an illuminating lamp 9 and the movable reflecting mirror 5 moved at ½ of the movement speed of the movable reflecting mirror 4 in the same direction as the mirror 4 and further via the lens 6 and the stationary reflecting mirrors 7 and 8.

The surface of the drum 2 comprises a photosensitive medium having a photosensitive layer covered with a transparent insulating layer, and the photosensitive medium is first charged to the positive polarity by a plus charger 10 supplied with a positive high voltage current from a high voltage source. Subsequently, when the photosensitive medium arrives at an exposure station 11, the original on the transparent plate of the original carriage 1 is illuminated by the illuminating lamp 9 and imaged on the drum 2 by the movable reflecting mirrors 4, 5, the lens 6 and the stationary reflecting mirrors 7, 8. The photosensitive medium is exposed to the image of the original while, at the same time, it is subjected to AC discharge by an AC discharger 12 supplied with an AC high voltage current from a high voltage source. The photosensitive medium is then subjected to whole surface exposure by a whole surface exposure lamp 13, whereby an electrostatic latent image is formed on the surface of the photosensitive drum, whereupon the drum enters a developing device 14. The electrostatic latent image is developed into a visible image by powder development using a magnetic sleeve system. Subsequently, copy paper S is fed from a paper supply station. The relay tray 15 and first paper feeding table 16*a* of the paper supply station are of the cassette type while the second paper feeding table 16*b* of the paper supply station of the deck type which has an automatic paper lifting device and which is capable of supporting a relatively large number of copy sheets thereon. As will hereinafter be described in detail, the relay tray 15 is used also as the paper feeding table during both-side copying.

The copy paper S fed by any of the relay tray 15, the first paper feeding table 16*a* and the second paper feeding table 16*b* of the paper supply station is brought into intimate contact with the drum 2 at an image transfer station. The image transfer charger 17 of the image transfer station effects positive charge on the copy paper by a high voltage source and transfers the image on the drum 2 onto the copy paper. After the image transfer, the copy paper is separated from the drum 2 at a separating station and directed to a fixing station 20 via a transportation path 19. The fixing station 20 comprises a fixing roller 21 having a heat source therein and a pressure roller 22 having a rubber layer on the surface thereof, and the copy paper having a powder image thereon passes between the rollers urged against each other, and thus the powder image is fixed on the copy paper by pressure and heat.

On the other hand, any toner remaining on the drum is removed by a cleaning blade 23 urged against the drum surface (photosensitive medium) and thus, the drum becomes ready for the next cycle of copying operation. After the fixation of the image, the copy paper S goes toward an exit (tray 24 or sorter B) pre-designated by the operator. When the tray 24 has been selected and designated, guides 25 and 27 operable by an exit designating signal pivot to a position indicated by broken line in the figure, and when the sorter B has been selected and designated, the guide 27 pivots to a position indicated by broken line while the guide 25 pivots to a position indication by solid line, and thus the copy paper S is directed to the respective designated exit. As will hereinafter be described, when the copy paper S goes toward the relay tray 15 and a reversing station 26, there is further a branch path, and in the case of one-side copying, guides 27 and 28 become positioned as indicated by broken line in the figure by a one-side copying mode button ON signal, so that the copy paper S is guided to the designated exit (tray 24 or sorter B) by change-over of the guide 25. Where plural copies are to be produced from one original, a sensor 29 provided at the exposure start position of the optical system detects the return of the optical system and outputs an exposure re-start signal. When the last one of a set number of copy sheets passes a sensor 30 or 31 provided near the designated exit, copying of the first original $O_1$ is terminated by the detection signal thereof. Thereafter, copying of up to the nth original $O_n$ is carried out by a similar process. When a jam occurs during copying, the apparatus will be immediately stopped from operation and the operator will dispose of the jam, whereafter the operator may actuate a copy start button whereby the deficient number of copy sheets caused by the jam will be supplied from the paper supply station 16*a* or 16*b* to enable the set number of be copied sheets to copy.

Description will now be made of the operation during both-side copying. In the case of both-side copying, the images of n sheet originals $O_1, O_2, \ldots, O_n$ having images to be copied on one side thereof are successively copied on both sides of plural copy sheets. First, a both-side mode button (not shown) provided on the operating board of the apparatus is actuated, and then a copy start button (not shown) is actuated, whereupon the copying operation is started. When the exposure and development for the first original $O_1$ is effected, the image on the photosensitive drum 2 is transferred onto a copy sheet fed from the first paper supply table 16*a* or the second paper supply table 16*b*, and this copy sheet is subjected to fixation at the fixing device 20, whereafter it is fed into the relay tray 15 via the transportation path 32. At this time, the guide 27 is changed over as indicated by solid line. The relay tray, as shown, is constructed with the paper feed port side thereof being lowered as compared with the opposite side thereof, so that copy sheets may have their leading end edges arranged properly by the gravity force on the paper feed port side to facilitate paper feed during the second side copying. When the first side copying on the set number of copy sheets has been carried out and all of these copy sheets have been contained in the relay tray 15, the first side copying is completed.

Next, the original $O_2$ to be copied on the second side is placed on the original carriage 1, and upon the copy button ON signal, the copy sheets in the relay tray 15 are successively fed out onto a transportation path 34 by a paper feed roller 33, and subjected to the processes of exposure, development, image transfer and fixation similar to the case of the first side copying, whereafter they are discharged into the designated exit (tray 24 or sorter B). At this time, the guides 27, 25 and 28 are changed over to the designated exit side by the second side copying start signal. If, at this time, the designated exit is the sorter B, the guides 27 (broken line), 25 (solid line) and 28 (solid line) are controlled so that the copy sheets pass through the reversing station 26 for page arrangement and are once reversed thereby and then go toward the sorter B.

In the reversing station 26, paper conveying rollers 35*a* and 35*b* are rotating in a direction for feeding copy paper in the direction of arrow C at this time. The copy paper is detected by a sensor 40 at a point of time whereat the trailing end edge thereof has passed a guide 37, whereupon the paper conveying rollers 35*a* and 35*b* start to rotate in the reverse direction and return the copy paper in the direction of arrow D. At this time, the copy paper advances toward the next conveying rollers 35*c* and 35*d* due to the rigidity thereof and is conveyed thereby while being nipped therebetween. The copy paper is detected by a sensor 39 at a point of time whereat the trailing end edge of the copy paper has left the paper conveying rollers 35*c* and 35*d*, whereupon the paper conveying rollers 35*a* and 35*b* stop rotating in the direction for feeding the copy paper in the direction of arrow D and are changed over to the rotation in the direction for feeding the copy paper in the direction of arrow C in preparation for the next copy paper. Control of the rotation of the paper conveying rollers 35*a* and 35*b* is accomplished by the signals of the sensors 39 and 40. At this time, the guides 37 and 28 are brought to the broken line position and the solid line position, respectively, by a both-side mode selection signal.

When the last one of the set number of copy sheets is detected by the sensor 30 or 31 without any trouble such as a jam, the operation shifts to the copying operation for the next original $O_2$.

Thereafter, in a manner similar to what has been described above, the original $O_3$ is copied on the first side of the copy paper, and the original $O_4$ is copied on the second side of the copy paper and thus, all the originals up to the original $O_n$ are copied.

An embodiment of the present invention is a both-side recording apparatus in which, as described above, a sheet having a first image recorded on the first side thereof is temporarily stored in the relay tray and subsequently a second image is recorded on the second side of the sheet, which apparatus is provided with a recording sheet control means for cyclically effecting, until the termination of the both-side recording, a first side jam mode in which, when a jam has occurred during the first side recording operation, the number of deficient sheets caused by the jam is fed from the paper supply station 16*a* or 16*b* and recording is continuously effected, and a second side jam mode in which, when a jam has occurred during the second side recording operation, the second image is recorded on the second side of the sheets remaining in the relay tray to effect compensational recording on the number of deficient sheets caused by the jam, whereafter the second image is recorded on the first side of the sheet fed out from the paper supply station 16*a* or 16*b*, and then the sheet is temporarily stored in the relay tray and subsequently the first image is recorded on the second side of said sheet. In the copying apparatus illustrated, when a jam has occurred during the first side copying for the original $O_1$, the apparatus is stopped from operating similar to the case of the one-side copying operation and the jammed paper is dealt with, whereafter copying is restarted, whereby the number of deficient copy sheets caused by the jam is supplied from the paper supply station 16*a* or 16*b* to effect copying on the set number of copy sheets. This is the first side jam mode. Next, when jam has occurred during the second side copying for the original $O_2$, the apparatus is likewise stopped from operating and the jam is dealt with, whereafter the apparatus is restarted, whereby the second side copying is effected on all of the first side copied sheets left in the relay tray 15 and the original $O_2$ is left on the original carriage and after the discharge to the designated exit, the first side copying of the original $O_2$ is effected on the deficient number of copy sheets caused by the jam and remaining on the designated paper supply table 16*a* or 16*b*. That is, the paper having one side thereof (the image of the original $O_2$) copied is fed into the relay tray 15. Subsequently, the second side copying of the original $O_1$ is effected on the sheets from the relay tray 15, whereby the both-side copying on the deficient number of copy sheets is completed. This is the second side jam mode. Thus, according to the present invention, the above-described first side jam mode and second side jam mode are cyclically effected until the termination of the both-side copying. Such control of the recording sheets is accomplished by a control system which controls the operation of the guides and the conveying rollers in accordance with the detection of the recording sheets by the above-described various sensors.

Thus, in the above-described apparatus, when recording sheets are discharged into the sorter, the recording sheets after the both-side recording are reversed in the reversing station. Also, in the second side jam mode, a first image is formed on the second side of the compensational recording sheet and a second image is formed on the first side of the compensational recording sheet and thus, the front and back sides thereof are reversed. To correct such reversal of the front and back sides, in the present invention, control of the recording sheet is effected so that where the image recorded on the second side of the compensationally recorded sheet is the above-mentioned second image, the compensationally recorded sheet is subjected to the reversing process zero times or even times or odd times in dependence on whether the number of times of the reversing process of the recording sheet before compensationally recorded is zero or even or odd, and that where the image recorded on the second side of the compensationally recorded sheet is the above-mentioned first image, the compensationally recorded sheet is subjected to the reversing process odd times or zero time or even times in dependence on whether the number of times of the reversing process of the recording sheet before being compensationally recorded is zero or even or odd.

In the illustrated embodiment, the copy paper having the image of the original $O_1$ on the second side thereof is discharged to the tray or the sorter which is the designated exit, but since the copy sheets after the compensation of the number of sheets after the jam during the second side copying have their front and back sides in reverse relationship with the copy sheets before the compensation, they must be once reversed for page arrangement. Accordingly, in the embodiment of the present invention, control is effected so that for example, where the designated exit is the sorter, the copy sheets before the compensation of the number of sheets are once reversed at the reversing station 26 and thereafter discharged to the sorter, while the copy sheets corresponding to the compensated number of sheets do not pass through the reversing station 26. Further, when jam has occurred during the formation of the image of the original $O_2$ on the first side, the operation of the first side jam mode is effected as described in connection with the first side jam for the original $O_1$ and, when jam has occurred during the formation of the image of the original $O_1$ on the second side, the operation of the second side jam mode is carried out. The jam dealing as described above is repeated until the both-side copying on the set number of sheets is completed. Accordingly, when the copy sheets are discharged to the designated exit, the reversing operation for page arrangement is effected in a manner similar to the reversing process before jam compensation where the images of even originals are to be formed on the second side and the reversing process is or is not effected one more time where the images of odd originals are to be formed on the second side. A sensor 38 is provided to detect the quantity of paper remaining in the relay tray 15.

Figure 2A:
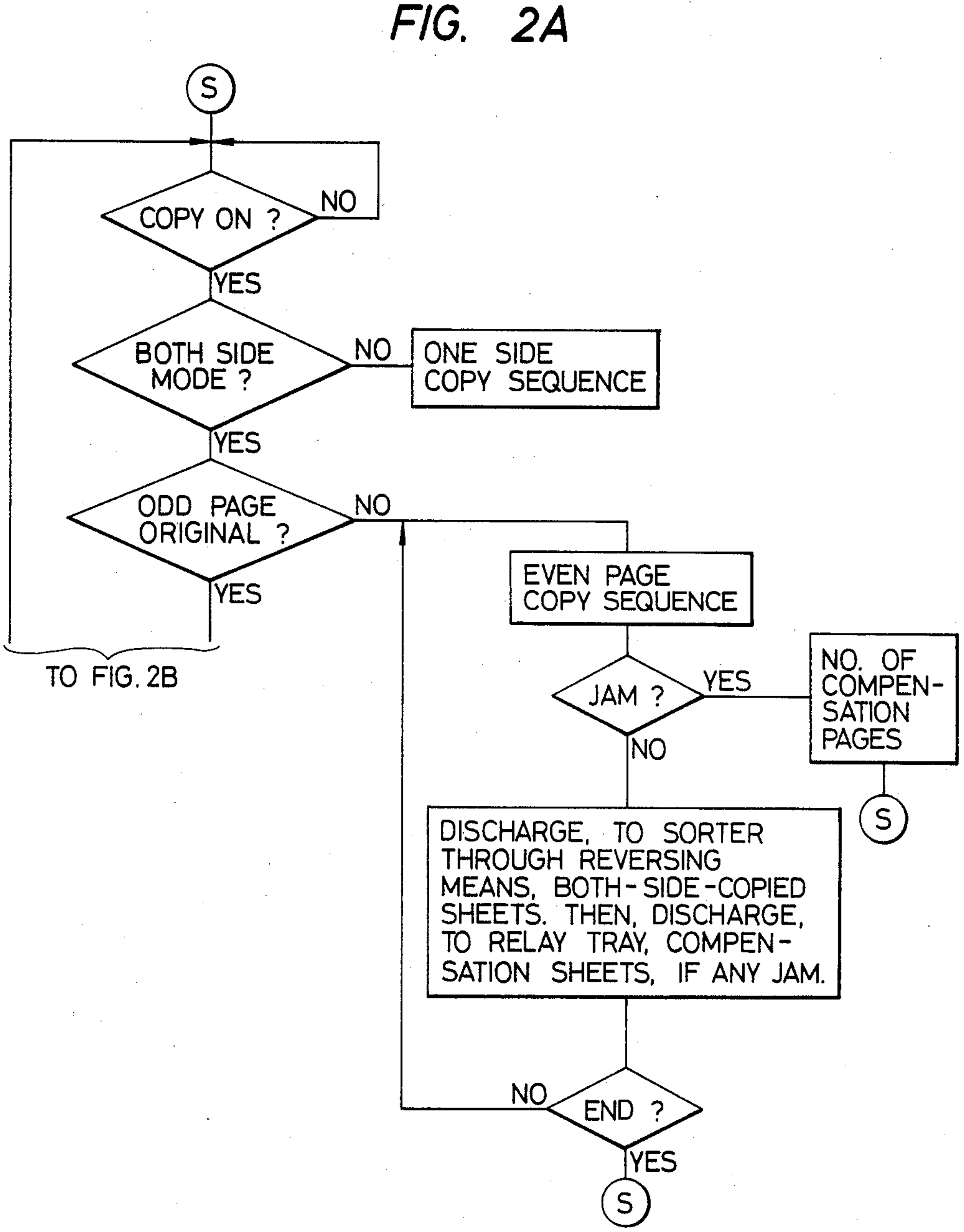
FIG. 2 composed of FIG. 2A
FIG. 2B is a flow chart of the copying operation.
Figure 2B:
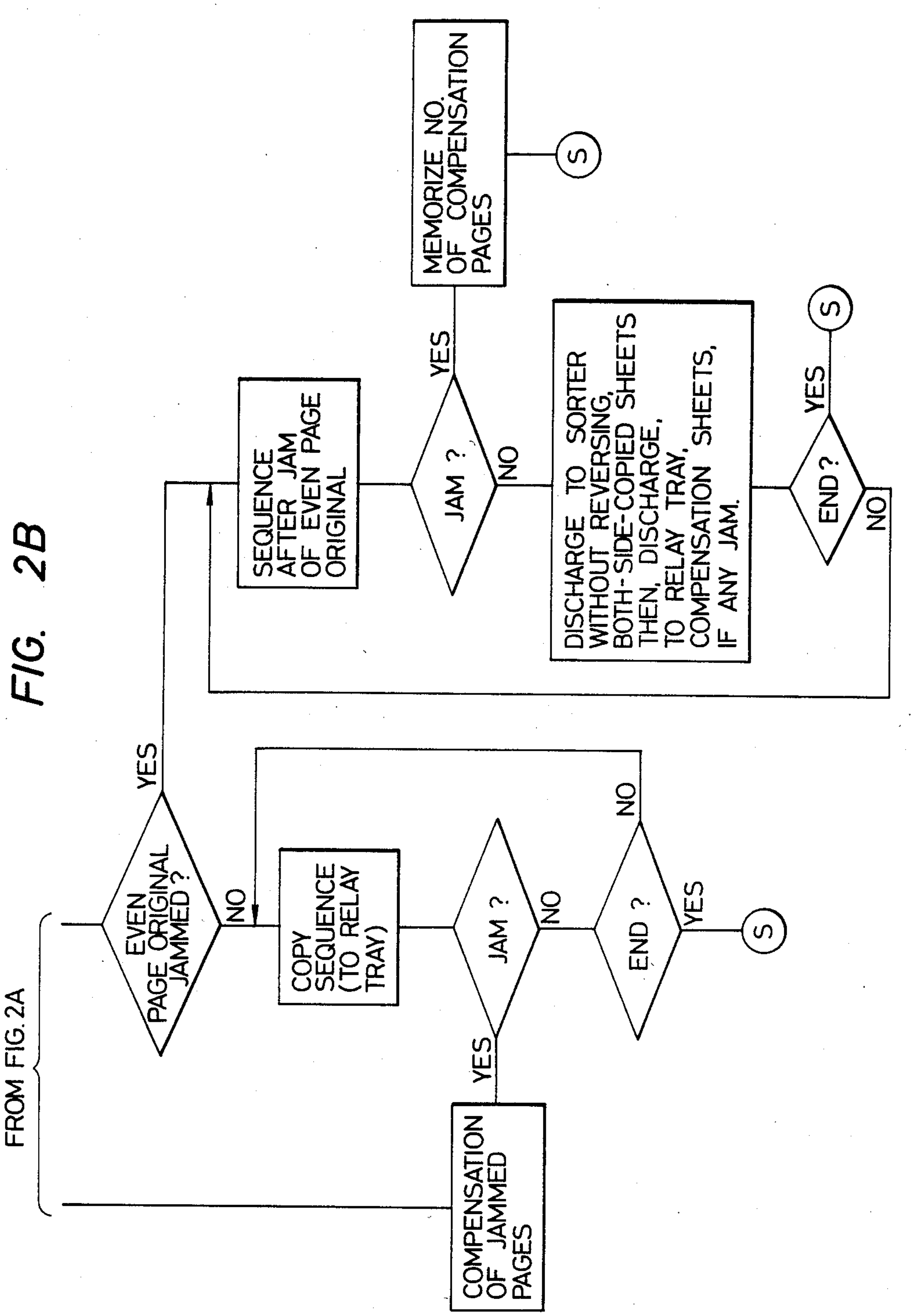

Reference is now had to the flow chart of FIG. 2 to describe the both-side copying operation in a case where the sorter B is used. First, the first original $O_1$ is placed on the original carriage, and a both-side copy mode button (not shown) is selected, whereby the both-side mode copying is started. In this case, the original is an odd page original and jam of an even page original has not occurred and therefore, all of the sheets having copied are directed to the relay tray 15. If jam occurs in these series of copying sequences, the number of sheets lost by the jam is compensated for and the compensational sheets are likewise directed to the relay tray. When the copying of the first original $O_1$ has been completed and the copying of the second original $O_2$ is started, the even page original copying sequence is started and the sheets having copied on both sides thereof are successively directed to the sorter B through the reversing station 26. At this time, the guide 27, 25 and 28 are controlled to the directions of dotted line, solid line and solid line, respectively, and the guide 37 is controlled to the direction of dotted line when the paper conveying rollers 35*a* and 35*b* are rotating so as to transport the sheets in the direction of arrow C, and controlled to the direction of solid line when the rollers 35*a* and 35*b* are rotating so as to transport the sheets in the direction of arrow D. If jam occurs in this even page original copying sequence, the both-side-copied sheets are all discharged to the sorter B, and then the image of the original $O_2$ is recorded on the first side of the sheets (supplied from the paper supply table 16*a* or 16*b*) corresponding to the number of sheets lost by the jam, and these sheets are directed to the relay tray 15, thus completing the even page original copying sequence. Description will now be made of the copying operation in a case where it is assumed that jam has occurred in this sequence and the copying has been started with the original $O_1$ again placed on the original carriage 1. This case is one after the jam of an even page original and therefore, the program shifts to the sequence after even page original jam and sheets are supplied from the relay tray 15 and the sheets having copied on both sides thereof are directed to the sorter B without passing through the reversing station 26. At this time, the guides 27, 25 and 28 are controlled to the directions of dotted line, solid line and dotted line, respectively. If jam occurs in the above-described sequence, the image of the original $O_1$ is recorded on the first side of sheets (supplied from the paper supply table 16*a* or 16*b*) corresponding to the number of sheets lost by the jam after all of the sheets having copied on both sides thereof have been discharged to the sorter B, and said sheets are directed to the relay tray 15, thus completing the above-described sequence.

Figure 3:
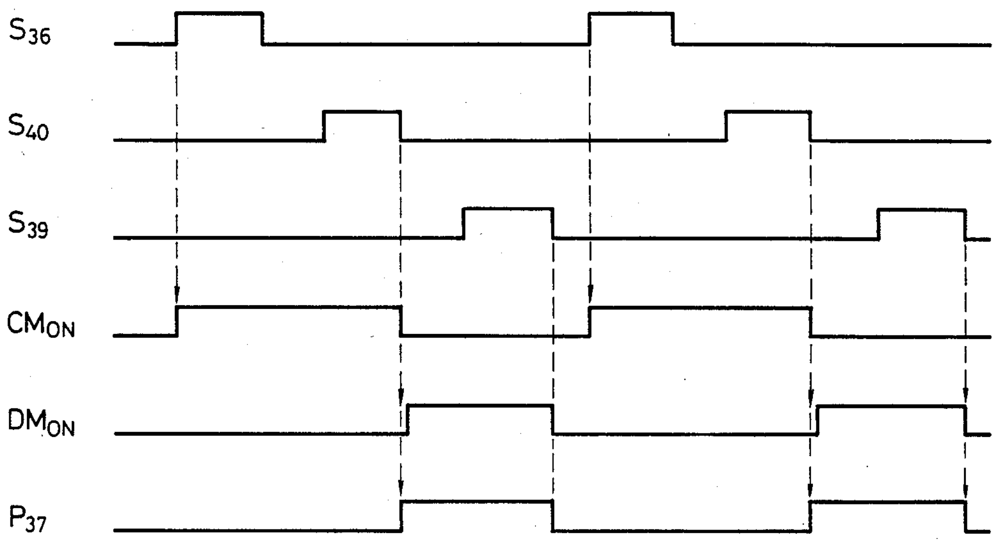
FIGS. 3 and 4 are timing charts.

Description will now be made of the timing chart in the reversing station 26 in the even page original copying sequence. FIG. 3 shows the timing chart in a case where the output signals of sensors 36, 40 and 39 are S36, S40 and S39, respectively, the signal for rotating a drive motor (not shown) for the paper conveying rollers 35*a* and 35*b* so as to transport sheets in the direction of arrow C is $CM_{ON}$, the signal for rotating the drive motor so as to transport sheets in the direction of arrow D is $DM_{ON}$ and the signal applied as input to a plunger (not shown) for controlling the guide 37 to the direction of solid line is P37.

When a sheet S is directed to the reversing station 26 by the guide 28, the signal S36 is put out from the sensor 36. By the rising of the signal S36, namely, by the leading end edge of the sheet S, the signal $CM_{ON}$ for rotating the drive motor for the paper conveying rollers 35*a* and 35*b* is produced and this motor is rotated in the direction C, so that the sheet S is transported in the direction C by the conveying rollers. Thereafter, when the trailing end edge of the sheet S is detected by the sensor 40, the signal $CM_{ON}$ is turned off and simultaneously therewith, the signal P37 to the plunger for energizing the guide 37 is put out. That is, the guide 37 is controlled to the direction of solid line. When the signal $DM_{ON}$ for reversing the drive motor is applied to the drive motor somewhat later than the signal P37, the sheet S is directed to the paper conveying rollers 35*d* and 35*c* by the guide 37. After the sheet S has passed the conveying rollers 35*d* and 35*c*, the signal S39 is put out from the sensor 39 and, when the trailing end edge (said leading end edge) of the sheet is detected by the signal S39, the drive motor driving signal $DM_{ON}$ and the plunger energizing signal P37 are turned off, whereupon the motor is stopped and the guide 37 is controlled to the direction of dotted line. The timing chart for one sheet S has been described above, and the timing charts for a second and subsequent sheets are similar to FIG. 3.

Figure 4:
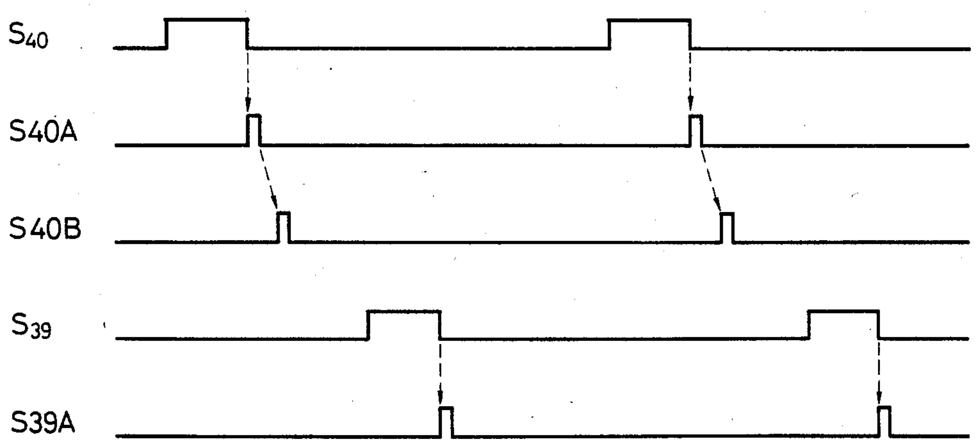
Figure 5:
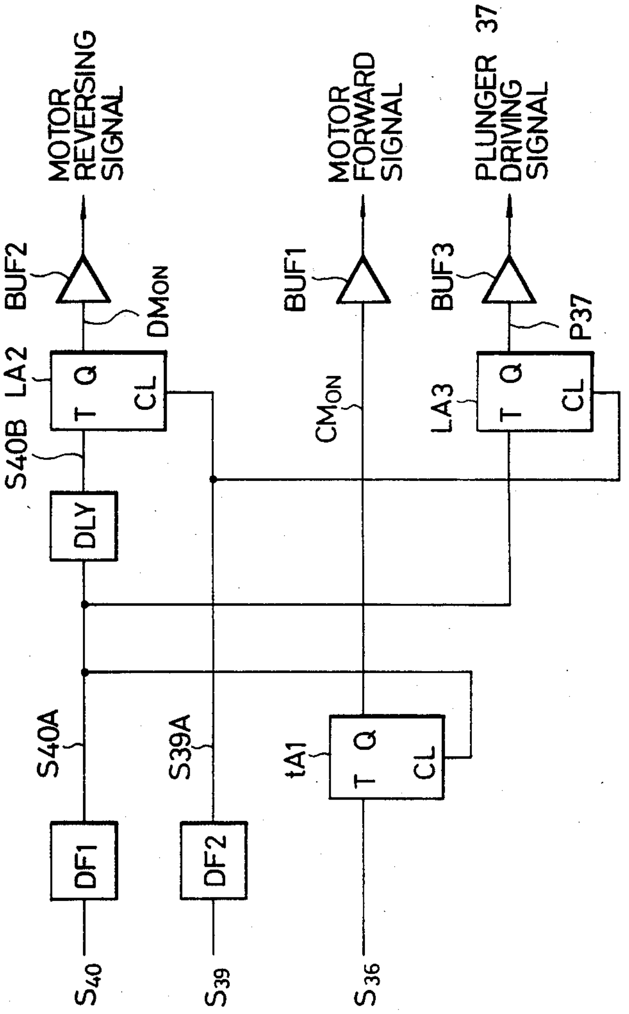
FIG. 5 is a diagram of an electric circuit.

Reference is now had to FIGS. 4 and 5 to describe an embodiment of the circuit for operating the reversing station 26. In FIG. 5, the output signal S36 of the sensor 36 is applied as input to the terminal T of a latch circuit LA1, which is latched by the rising of the signal S36, and the signal $CM_{ON}$ for driving the paper conveying rollers 35*a* and 35*b* is put out from the terminal Q of the latch circuit LA1. On the other hand, the output signal S40 from the sensor 40 is applied as input to a differentiating circuit DF1, from which a paper trailing end detection signal such as the signal S40A of FIG. 4 is put out and applied as input to the clear terminal CL of the latch circuit LA1. By these series of operations, the signal $CM_{ON}$ is produced and applied as input to a motor driving circuit (not shown) via an amplifier circuit BuF1, whereupon the paper conveying rollers 35*a* and 35*b* are rotated to move the sheet S in the direction C. Further, the above-mentioned signal S40A is applied as input to a delay circuit DLY, whereby a signal S40B somewhat delayed with respect to the signal S40A, such as the signal S40B of FIG. 4, is produced and applied to the terminal T of a latch circuit LA2, which is latched by the rising of the signal S40B, and the signal $DM_{ON}$ for driving the paper conveying rollers 35*a* and 35*b* is put out from the terminal Q of the latch circuit LA2. Similarly to the case of the signal $CM_{ON}$, the differentiated signal S39A of the signal S39 is applied as input to the clear terminal CL of the latch circuit LA2 from a differentiating circuit DF2, and by these series of operations, the signal $DM_{ON}$ is produced and applied as input to the motor driving circuit through an amplifier circuit BuF2, whereupon the paper conveying rollers 35*a* and 35*b* are rotated to move the sheet S in the direction D.

The signal S40A is applied as input to the terminal T of a latch circuit LA3 and the signal S39A is applied as input to the clear terminal CL of the latch circuit LA3, and the signal P37 to be applied as input to the plunger for controlling the guide 37 to the direction of solid line is put out from the output terminal Q of the latch circuit LA3, whereby the actual driving signal is obtained through an amplifier circuit BuF3.

What we claim is:

1. A recording apparatus for recording images on both sides of a sheet, comprising:

sheet feeding means for feeding copy sheets to a recording portion of said apparatus;

first feeding means for receiving a predetermined number of the sheets in a relay tray after they are fed by said sheet feeding means and after first images are recorded by said recording portion on first sides of said sheets, and for then feeding the sheets from the relay tray to said recording portion for recording second images on second sides of said sheets;

first discharge means for discharging the sheets which are image-recorded on both sides thereof in a reversing mode where the sheets are reversed or in a non-reversing mode where the sheets are not reversed;

second feeding means for detecting a lacking number of both-side recorded sheets, as compared to the predetermined number, during recording of the second images on the second sides of the sheets, whereas said second feeding means, after the sheets in the relay tray are fed for recording second images reserves the lacking number of sheets in the relay tray and then feeds the reserved sheets from the relay tray to the recording portion for recording first images on the second sides of the sheets; and second discharge means for discharging the sheets image-recorded on both sides thereof at the recording portion by said second feeding means in the opposite mode to the mode effected by the first discharge means.

2. A both-side recording apparatus according to claim 1, in which the front end side of the relay tray, in the sheet feed advancing direction, is inclined downwardly.

* * * * *

UNITED STATES PATENT AND TRADEMARK OFFICE
CERTIFICATE OF CORRECTION

PATENT NO. : 4,561,767

DATED : December 31, 1985

INVENTOR(S) : TOMOHIRO AOKI, ET AL.

It is certified that error appears in the above-identified patent and that said Letters Patent is hereby corrected as shown below:

AT [57] IN THE ABSTRACT

Line 8, "effect" should read --effected--..

COLUMN 1

Line 55, "of" should read --of a--.

COLUMN 2

Line 11, delete "whereafter".
Line 23, "number number" should read --number--.

COLUMN 4

Line 7, "indication" should read --indicated--.
Line 31, "of be copied sheets to copy." should read --of copy sheets to be copied.--.

COLUMN 6

Line 42, after "before" insert --being--.

UNITED STATES PATENT AND TRADEMARK OFFICE

CERTIFICATE OF CORRECTION

PATENT NO. : 4,561,767

DATED : December 31, 1985

INVENTOR(S) : TOMOHIRO AOKI, ET AL.

It is certified that error appears in the above-identified patent and that said Letters Patent is hereby corrected as shown below:

COLUMN 7

Line 35, "guide" should read --guides--.

Signed and Sealed this

*Twelfth* Day of *August 1986*

[SEAL]

*Attest:*

DONALD J. QUIGG

*Attesting Officer* *Commissioner of Patents and Trademarks*